(12) United States Patent
Ma et al.

(10) Patent No.: US 12,743,419 B1
(45) Date of Patent: Sep. 22, 2026

(54) DATABASE QUERY OPTIMIZATION FOR COUNT DISTINCT OPERATIONS

(71) Applicant: Zoom Communications, Inc., San Jose, CA (US)

(72) Inventors: Jiyue Ma, Hangzhou (CN); Wei Zhang, Hangzhou (CN)

(73) Assignee: Zoom Communications, Inc., San Jose, CA (US)

( * ) Notice: Subject to any disclaimer, the term of this patent is extended or adjusted under 35 U.S.C. 154(b) by 0 days.

(21) Appl. No.: 19/085,270

(22) Filed: Mar. 20, 2025

(51) Int. Cl.
*G06F 16/00* (2019.01)
*G06F 16/2453* (2019.01)
*G06F 16/2455* (2019.01)

(52) U.S. Cl.
CPC .... *G06F 16/24537* (2019.01); *G06F 16/2455* (2019.01)

(58) Field of Classification Search
CPC ....................... G06F 16/24537; G06F 16/2455
See application file for complete search history.

(56) References Cited

U.S. PATENT DOCUMENTS 5,367,675 A 11/1994 Cheng et al.
5,713,015 A 1/1998 Goel et al.
5,864,847 A 1/1999 Goel et al.
5,875,447 A 2/1999 Goel et al.
6,574,623 B1 6/2003 Leung et al.
6,757,677 B2 6/2004 Pham et al.
7,958,114 B2 6/2011 Chaudhuri et al.
7,966,314 B2 6/2011 Zuzarte et al.
8,832,157 B1 9/2014 Shatdal et al.
8,868,545 B2 10/2014 Xu et al.
9,305,065 B2 4/2016 Weyerhaeuser et al.
10,007,700 B2 6/2018 Bondalapati et al.
11,016,974 B2 5/2021 Rajan et al.
11,144,550 B2 10/2021 Chen et al.
11,650,991 B2 5/2023 Bellamkonda et al.
11,704,317 B2 7/2023 Fender et al.
11,971,888 B2 4/2024 Chen et al.
2012/0078904 A1* 3/2012 Agrawal ............. G06F 16/2228 707/E17.089
2021/0109930 A1* 4/2021 Petride ................ G06F 16/2393
2022/0092069 A1* 3/2022 Hartsing ........... G06F 16/24544
2023/0024553 A1 1/2023 Ahmed et al.
2024/0241883 A1 7/2024 Chen et al.
2024/0289330 A1 8/2024 Ahmed et al.

FOREIGN PATENT DOCUMENTS

CN 113918597 A * 1/2022 ......... G06F 16/2457

* cited by examiner

*Primary Examiner* — Dinku W Gebresenbet
(74) *Attorney, Agent, or Firm* — Young Basile Hanlon & MacFarlane, P.C.

(57) ABSTRACT

A query that includes a plurality of COUNT(DISTINCT) operations applied to a same dimensional column with conditional filtering is received. The query is transformed to obtain a transformed query. Transforming the query includes rewriting the plurality of COUNT(DISTINCT) operations into corresponding aggregation operations using a first combination of SUM( ) and COUNT( ) or a second combination using SUM( ) and MAX( ); and generating the transformed query incorporating the aggregation operations. The transformed query is then transmitted to a database system for execution to generate a query result.

20 Claims, 12 Drawing Sheets

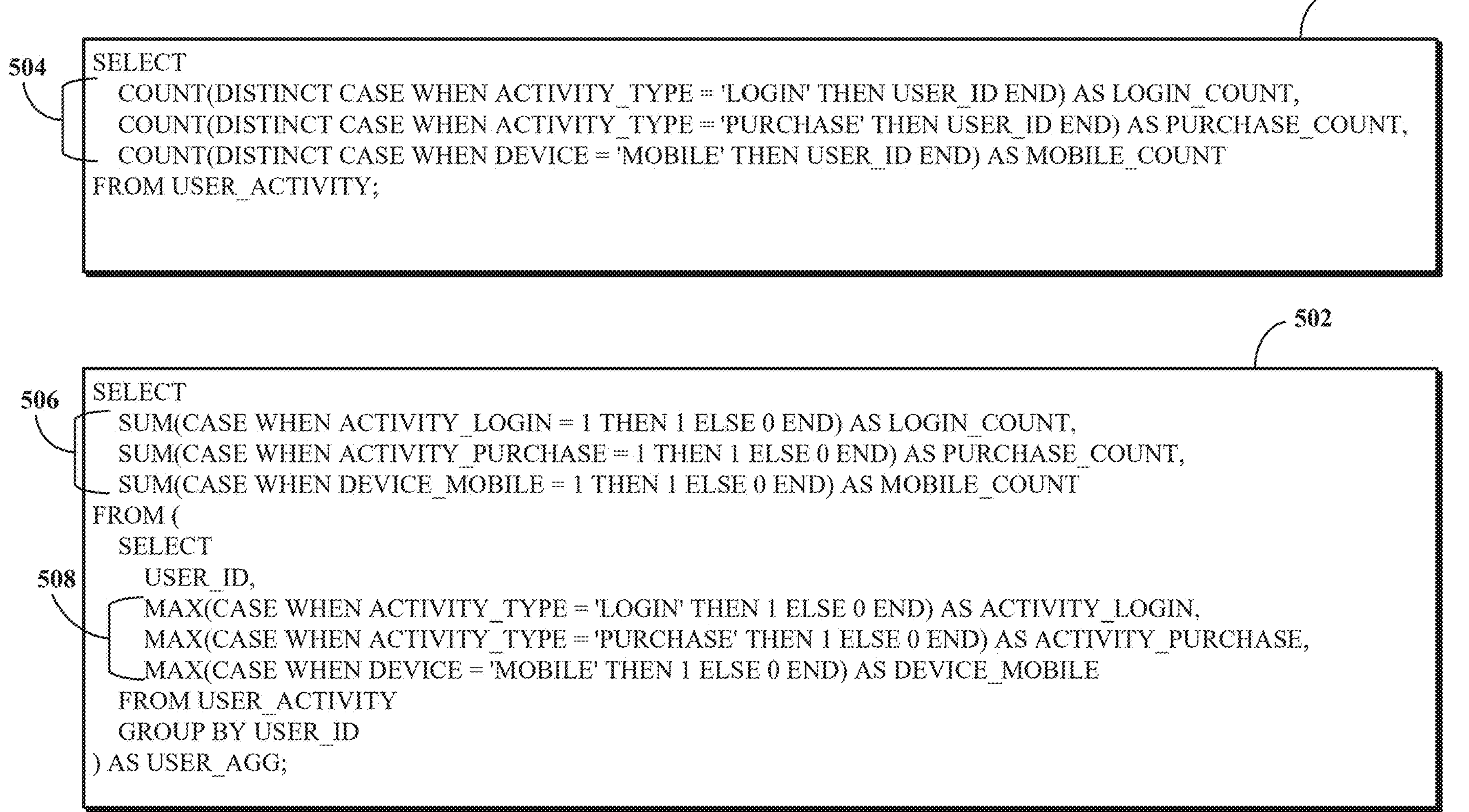

```
SELECT
   COUNT(DISTINCT CASE WHEN ACTIVITY_TYPE = 'LOGIN' THEN USER_ID END) AS LOGIN_COUNT,
   COUNT(DISTINCT CASE WHEN ACTIVITY_TYPE = 'PURCHASE' THEN USER_ID END) AS PURCHASE_COUNT,
   COUNT(DISTINCT CASE WHEN DEVICE = 'MOBILE' THEN USER_ID END) AS MOBILE_COUNT
FROM USER_ACTIVITY;
```

```
SELECT
   SUM(CASE WHEN ACTIVITY_LOGIN = 1 THEN 1 ELSE 0 END) AS LOGIN_COUNT,
   SUM(CASE WHEN ACTIVITY_PURCHASE = 1 THEN 1 ELSE 0 END) AS PURCHASE_COUNT,
   SUM(CASE WHEN DEVICE_MOBILE = 1 THEN 1 ELSE 0 END) AS MOBILE_COUNT
FROM (
   SELECT
      USER_ID,
      MAX(CASE WHEN ACTIVITY_TYPE = 'LOGIN' THEN 1 ELSE 0 END) AS ACTIVITY_LOGIN,
      MAX(CASE WHEN ACTIVITY_TYPE = 'PURCHASE' THEN 1 ELSE 0 END) AS ACTIVITY_PURCHASE,
      MAX(CASE WHEN DEVICE = 'MOBILE' THEN 1 ELSE 0 END) AS DEVICE_MOBILE
   FROM USER_ACTIVITY
   GROUP BY USER_ID
) AS USER_AGG;
```

| COLUMN NAME | IS CATEGORICAL | DISTINCT VALUES | NULL COUNT | LAST UPDATED |
|---|---|---|---|---|
| ACTIVITY_TYPE | Yes | 2 | 0 | 2/13/2025 |
| DEVICE | Yes | 3 | 0 | 2/13/2025 |
| USER_ID | No | 1000000 | 0 | 2/13/2025 |

512

| COLUMN NAME | VALUE | COUNT | PERCENTA | LAST UPDATED |
|---|---|---|---|---|
| ACTIVITY_TYPE | LOGIN | 500000 | 50% | 2/13/2025 |
| ACTIVITY_TYPE | PURCHASE | 200000 | 20% | 2/13/2025 |
| DEVICE | MOBILE | 400000 | 40% | 2/13/2025 |
| DEVICE | DESKTOP | 500000 | 50% | 2/13/2025 |
| DEVICE | TABLET | 100000 | 10% | 2/13/2025 |

| COLUMN NAME | MIN VALUE | MAX VALUE | CONTAINS NEGATIVES? | LAST UPDATED |
|---|---|---|---|---|
| GDI_RENDERER_COUNT | 0 | 100 | No | 2/13/2024 |
| D3D_RENDERER_COUNT | 0 | 50 | No | 2/13/2024 |

612

| COLUMN NAME | IS CATEGORICAL | DISTINCT VALUE COUNT | NULL COUNT | LAST UPDATED |
|---|---|---|---|---|
| MEETING_UUID | No | - | 0 | 2/13/2024 |
| USER_NODE_ID | No | - | 0 | 2/13/2024 |
| GDI_RENDERER_COUNT | No | - | 0 | 2/13/2024 |
| D3D_RENDERER_COUNT | No | - | 0 | 2/13/2024 |

FIG. 6B

DATABASE QUERY OPTIMIZATION FOR COUNT DISTINCT OPERATIONS

FIELD

This disclosure generally relates to database queries and, more specifically, to query transformation of certain query operations.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 5A-5B illustrate a first example of a query transformation that may be performed using a combination of aggregation operations.

FIGS. 6A-6B illustrate a second example of a query transformation that may be performed using a combination of aggregation operations.

DETAILED DESCRIPTION

Figure 1:
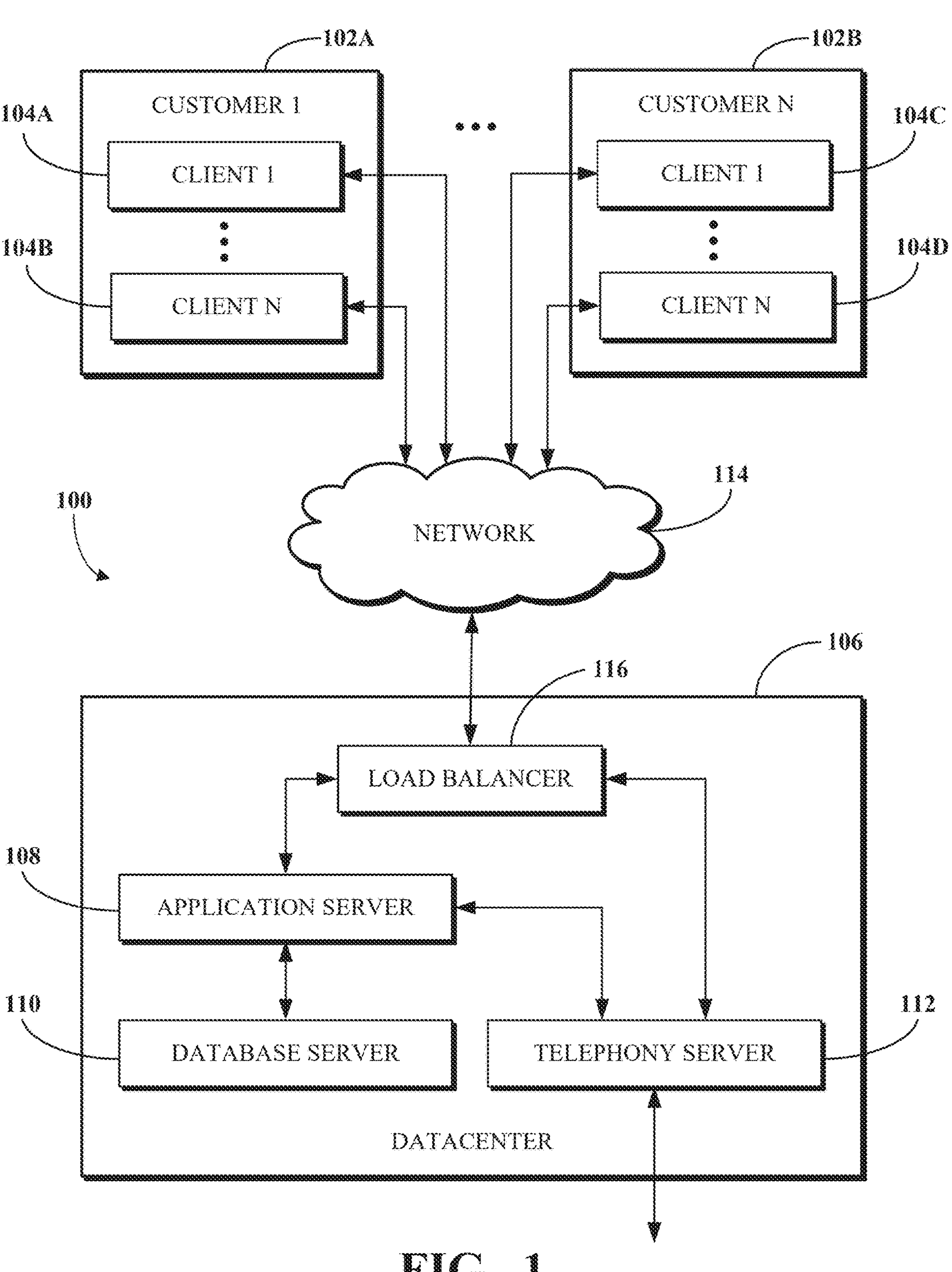
FIG. 1 is a block diagram of an example of an electronic computing and communications system.
Figure 3:
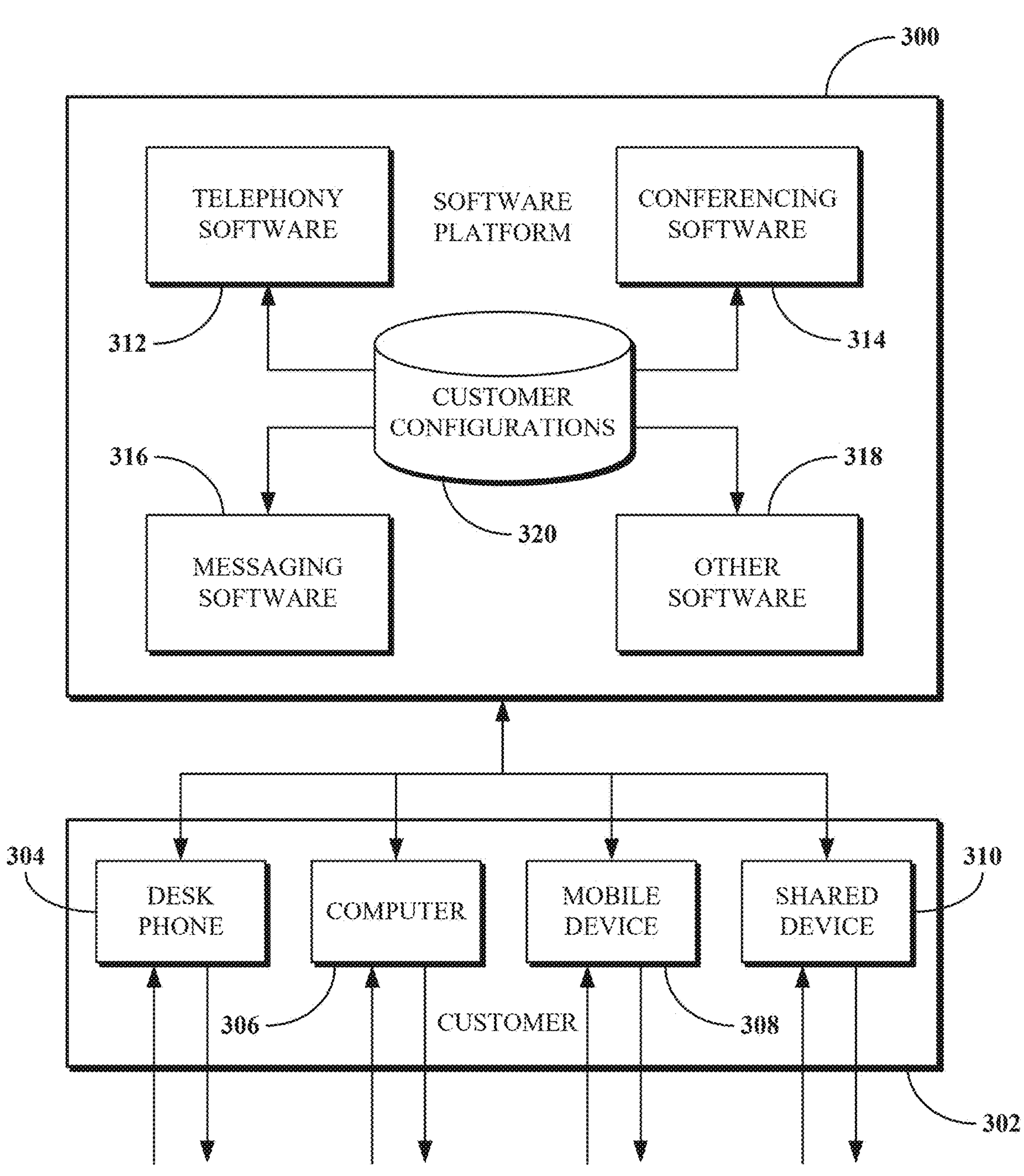
FIG. 3 is a block diagram of an example of a software platform implemented by an electronic computing and communications system.

In the contemporary digital landscape, information technology (IT) systems, such as those illustrated in FIG. 1 and the unified communications as a service (UCaaS) platform described with respect to FIG. 3, play a critical role in managing large-scale distributed computing environments. These systems rely on queryable datastores (e.g., databases) and query languages (such as structured query languages (SQL)) to execute data analytics and processing tasks against the stored data. Many queries may include COUNT (DISTINCT) operations—which are aggregation functions that count unique values—as part of larger query clauses for deriving meaningful insights from stored data (e.g., user interaction data, system metrics, and operational analytics). A COUNT(DISTINCT) operation counts the number of unique values in a dataset while eliminating duplicates. For example, a query might include multiple COUNT(DISTINCT) operations to analyze different aspects of user behavior in a single request, such as:

TABLE I

```
SELECT meeting_uuid,
    COUNT(DISTINCT CASE WHEN gdi_renderer_count > 0
THEN user_node_id END) as gdi_renderer_attendee_cnt,
    COUNT(DISTINCT CASE WHEN d3d_renderer_count > 0
THEN user_node_id END) as d3d_renderer_attendee_cnt,
    COUNT(DISTINCT CASE WHEN metal_renderer_count > 0
THEN user_node_id END) as metal_renderer_attendee_cnt
  FROM meeting_data GROUP BY meeting_uuid;
```

Current distributed computing solutions handle COUNT (DISTINCT) operations by expanding the processed data, often by a factor proportional to the number of distinct count operations in the query. For the example query above, the query engine may create three separate data partitions: one to track unique user_node_ids for gdi_renderer users, another for d3d_renderer users, and a third for metal_renderer users. Each partition may maintain its own hash table for tracking unique values, effectively tripling the memory footprint of the original dataset. As table sizes grow and queries incorporate multiple COUNT(DISTINCT) statements, these inefficiencies become more pronounced, leading to excessive memory consumption, prolonged query execution times, and increased computational overhead. This scalability bottleneck presents a critical challenge for real-time analytics and large-scale distributed data processing environments.

Implementations according to this disclosure address problems such as these using query optimization software that optimizes queries containing multiple COUNT(DISTINCT) operations through statistical analysis and query transformation. The technical solution implemented by the query optimization software improves query processing efficiency by transforming multiple COUNT(DISTINCT) operations into alternative aggregation operations that avoid repeated data expansion while maintaining semantic correctness. At a fundamental level, the query optimization software analyzes queries to identify situations where multiple COUNT(DISTINCT) operations would traditionally require expanding the dataset multiple times.

By leveraging statistical properties of the queried data and analyzing how conditions are applied in the filtering (e.g., whether they use equality operations, greater-than comparisons, or IN operators), the query optimization software can transform these operations into alternative aggregation approaches that process the data more efficiently without requiring multiple expansions of the dataset. For example, in a query containing "COUNT(DISTINCT CASE WHEN status='active' then user_id end)", the filtering condition "status='active'" selects only those rows where the status column has the value 'active' before counting distinct user IDs. Similarly, filtering using "age >25" or "country IN ('US', 'UK', 'CA')" would select rows based on those respective conditions before performing the COUNT(DISTINCT) operation.

As further described herein, the query optimization software can transform operations differently based on the type of filtering conditions used. When equality operations are used in the filtering conditions, the transformation can use MAX( ) operations. When conditional filtering involves comparison operations (such as greater-than), the query optimization software analyzes statistical properties of the relevant columns to determine if the operation can be safely transformed into alternative aggregation logic using SUM( ) and COUNT operations. These transformations are only applied when statistical analysis confirms that the transformations will preserve the original query semantics.

As used herein, "COUNT(DISTINCT)" refers to a database operation that counts unique values in a dataset while eliminating duplicates. For example, COUNT(DISTINCT user_id) would count each user only once even if they appear multiple times in the data. The term "conditional filtering" refers to criteria applied to select specific rows for counting, such as "CASE WHEN renderer_count >0" which only counts rows where the renderer_count value exceeds zero.

The query optimization software may maintain a statistics cache (e.g., one or more tables of statistics) that stores properties of database columns, such as whether a column contains negative values or its value distribution characteristics. For example, if a column is known to contain only non-negative values, a COUNT(DISTINCT) operation with a greater-than condition can be safely rewritten as a simpler aggregation operation without losing accuracy.

The query optimization software provides additional technical improvements through adaptive query execution and selective transformation. The term "adaptive query execution" refers to the ability to adjust query plans during runtime based on actual data characteristics. "Selective transformation" can be used to optimize only those operations where statistical criteria are met while maintaining original operations elsewhere, resulting in hybrid queries that balance performance and accuracy. For instance, in a query analyzing different types of renderer usage across meetings, some COUNT(DISTINCT) operations might be transformed while others remain unchanged based on their statistical properties. The query optimization software may also handle computed columns, defined as columns derived from mathematical expressions or user-defined functions applied to base columns, by analyzing whether statistical properties are preserved through the computation.

To describe some implementations in greater detail, reference is first made to examples of hardware and software structures used to implement a system for performance optimization of COUNT(DISTINCT) operations. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a UCaaS platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and/or to clients of a customer, such as the clients 104A through 104B for the customer 102A or the clients 104C through 104D for the customer 102B. For example, one or more of the clients 104A through 104D may be voice over internet protocol (VOIP)-enabled devices configured to send and receive calls over a network 114. The telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, an SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, an SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
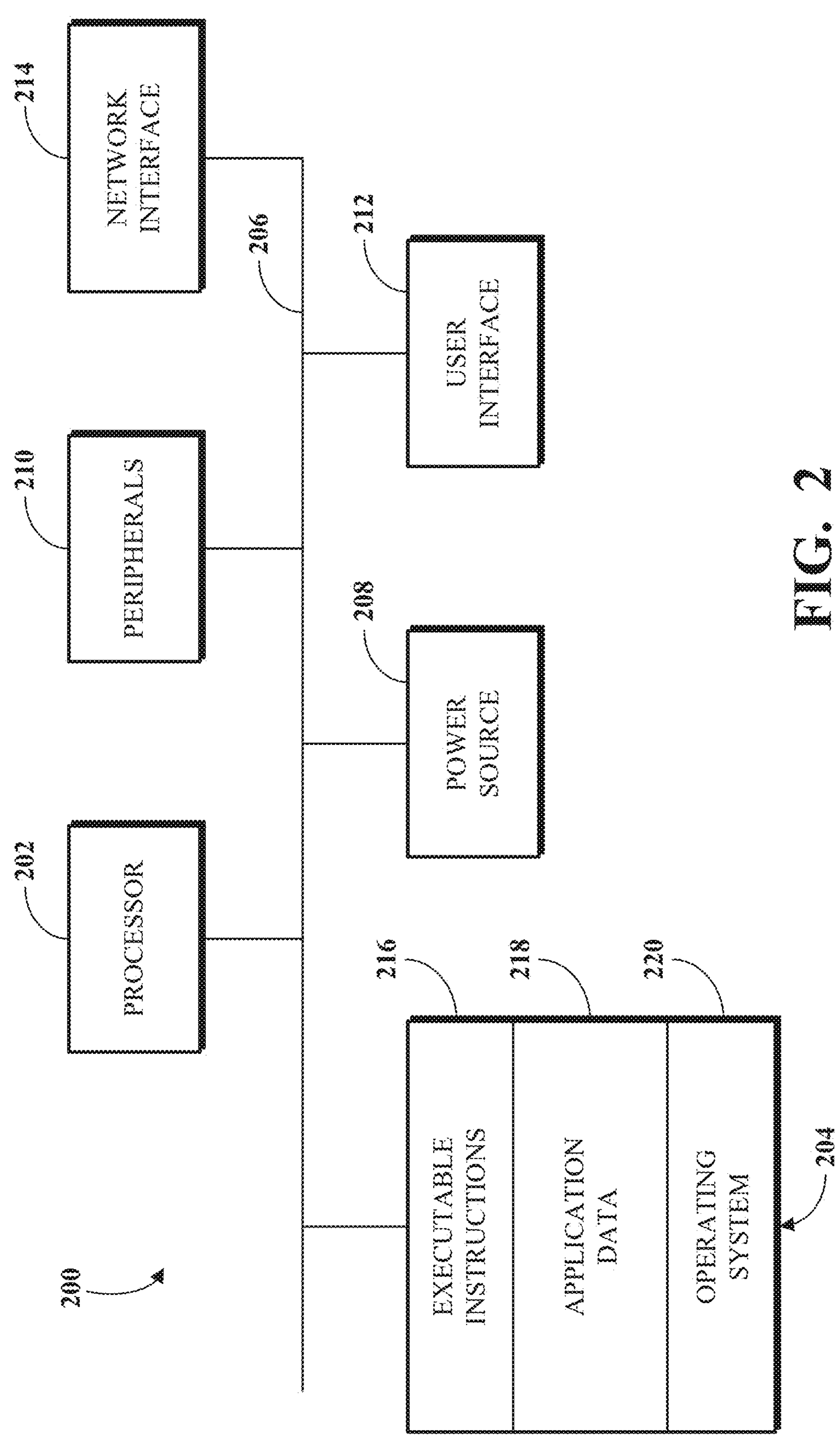
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients-a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include a query optimization software that optimized queries that include multiple COUNT(DISTINCT) operations on a same dimensional column.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
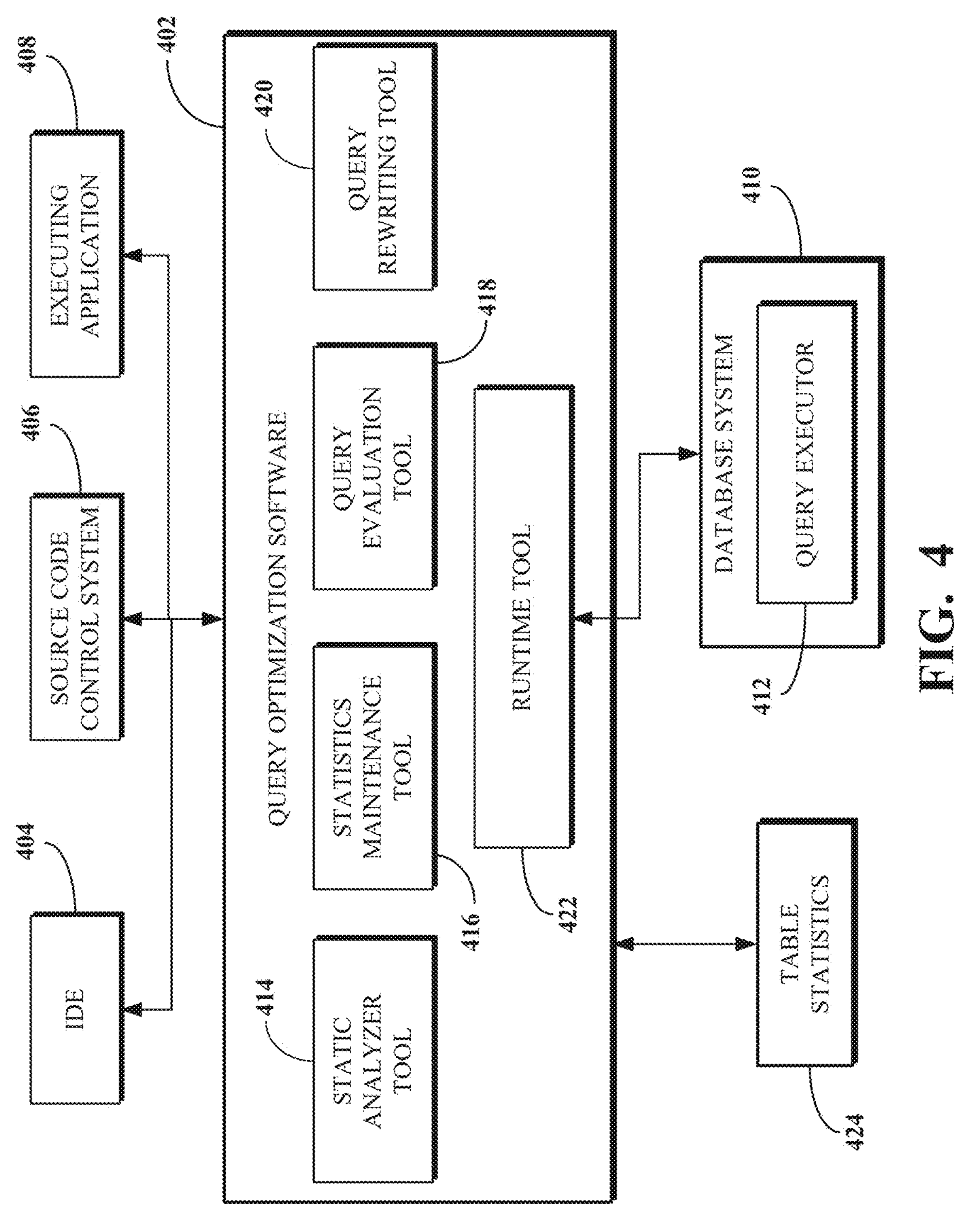
FIG. 4 is a high-level block diagram of a system where query transformation, such as to improve performance of COUNT(DISTINCT) operations, can be implemented.

FIG. 4 is a high-level block diagram of a system 400 where query transformation, such as to improve performance of COUNT(DISTINCT) operations, can be implemented. The system 400 is shown as including query optimization software 402, which, in various implementations, may interact with one or more of an Integrated Development Environment (e.g., an IDE 404), a source code control system 406, and/or an executing application 408. The query optimization software 402 may also communicate with a database system 410, which includes a query executor 412. The database system 410 may be implemented as a distributed database system that manages and stores data across multiple nodes, while the query executor 412 may be configured to execute optimized queries against the database system 410 and manage query execution across distributed nodes.

In some implementations, the query optimization software 402 may interact with external systems through multiple interaction paths. In a first interaction path, a developer working within the IDE 404 may select a query statement in their source code and transmit it to the query optimization software 402 for analysis and potential optimization (i.e., rewrite or transformation), as described herein. Upon receiving the query, the query optimization software 402 may analyze the query's structure, evaluate available statistics, and either transmit back a transformed query (e.g., rewritten query) that incorporates performance optimizations or provide detailed feedback explaining why the query cannot be rewritten. Such feedback may include identification of missing statistical information, detection of unsafe transformation conditions, or explanation of semantic preservation issues.

In a second interaction path, when source code is checked into the source code control system 406, the source code control system 406 may automatically transmit the checked-in source code (or the source code of queries therein) to the query optimization software 402 for analysis. The query optimization software 402 may scan the source code for query statements, analyze them for optimization opportunities, and potentially store optimization strategies for future use.

In a third interaction path, during runtime execution, when the executing application 408 executes a query, the query may be received by the query optimization software 402, which may be implemented as a component of, integrated within, or operate in close conjunction with the database system 410. In this runtime scenario, the query optimization software 402 may analyze the query, evaluate current statistics and runtime conditions, and determine whether to rewrite the query before execution.

The query optimization software 402 may be configured to analyze and optimize database queries, particularly those containing COUNT(DISTINCT) operations, to improve query performance. In some implementations, the query optimization software 402 may transform multiple COUNT (DISTINCT) operations into alternative aggregation operations that avoid repeated data expansion while maintaining semantic correctness.

The query optimization software 402 may transform multiple COUNT(DISTINCT) operations into alternative aggregation operations that avoid repeated data expansion while maintaining semantic correctness. In this context, maintaining semantic correctness means ensuring that the transformed query produces exactly the same results as the original query under all possible data distributions and conditions. For example, when transforming a query containing COUNT(DISTINCT CASE WHEN condition THEN user_id END), semantic correctness requires that the transformed query must: (1) count each unique user_id exactly once, even if it appears in multiple rows, (2) only count user_ids that satisfy the specified condition, (3) handle null values consistently with the original query, and (4) maintain proper grouping semantics when GROUP BY clauses are present.

The query optimization software 402 may verify semantic correctness through multiple mechanisms. For queries involving greater-than conditions on a column (e.g., COUNT(DISTINCT CASE WHEN value >0 THEN id END)), the query optimization software 402 may check whether the column contains only non-negative values before transforming the query to use SUM( ) operations, as negative values could cause incorrect results when summed, as further described herein. For equality conditions (e.g., COUNT(DISTINCT CASE WHEN status='active' THEN id END)), the software may verify that the transformation preserves the original distinct counting semantics when converting to MAX( ) operations.

In scenarios involving multiple conditions combined with logical operators (e.g., COUNT(DISTINCT CASE WHEN col1>0 OR col2='test' THEN id END)), the query optimization software 402 may analyze the statistical properties of all involved columns and their relationships to ensure that the transformed query correctly handles all possible combinations of condition values. The query optimization software 402 may also validate that any computed columns or expressions used in conditions maintain their statistical properties through the transformation process.

The query optimization software 402 includes tools, such as programs, subprograms, functions, routines, subroutines, operations, executable instructions, and/or the like for, inter alia and as further described below, transforming queries that include multiple COUNT(DISCTINCT) operations. At least some of the tools of the query optimization software 402 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

The query optimization software 402 is shown as including a static analyzer tool 414, a statistics maintenance tool 416, a query evaluation tool 418, a query rewriting tool 420, and a runtime tool 422. In some implementations, the query optimization software 402 can include more or fewer tools. In some implementations, some of the tools may be combined, some of the tools may be split into more tools, or a combination thereof.

The static analyzer tool 414 may implement static analysis capabilities for query optimization at both development time and source control integration points. The purpose of this analysis at development time may be to identify potential performance bottlenecks or opportunities for improved performance before queries are deployed to production environments. For instance, the static analyzer tool 414 may detect patterns where multiple COUNT(DISTINCT) operations are applied to the same dimensional column with conditional filtering, which could lead to redundant data expansion and memory overhead in computing environments. By identifying these patterns during development, developers may modify queries to use more efficient patterns before the queries are committed to source control.

A "dimensional column," as used herein, refers to a column in a database table that represents a primary dimension or attribute along which data is analyzed and aggregated, often in conjunction with conditional expressions that further refine the analysis.

At source control integration points, the purpose of static analysis may be to identify opportunities for optimization by identifying rewritable queries. The static analyzer tool 414 may scan all SQL queries being checked into the source code repository to identify queries that could benefit from transformation. For example, when analyzing a query containing COUNT(DISTINCT) operations, the static analyzer tool 414 may determine whether the query includes multiple such operations.

The static analyzer tool 414 may further serve to provide early validation of statistical requirements for query transformation. For instance, when a query uses greater-than conditions in COUNT(DISTINCT) operations, the static analyzer tool 414 may flag these for statistical validation to ensure the involved columns maintain the necessary statistical properties (such as non-negativity) for safe transformation. This early validation may help prevent deployment of queries that could produce incorrect results after transformation.

The statistics maintenance tool 416 implements a statistical analysis and maintenance system for database columns. The statistics maintenance tool 416 may maintain a multi-tiered statistics cache that operates at both the column and table levels. The statistics maintenance tool 416 may track multiple statistical measures including value distributions, cardinality estimates, null value frequencies, minimum values, maximum values, correlation coefficients with related columns. The statistics maintenance tool 416 implements efficient data structures for storing these statistics, such as count-min sketches (a probabilistic data structure that serves as a frequency table of events in a stream of data while using sub-linear space) for approximate frequency counting and bloom filters for membership testing. Count-min sketches are particularly useful for maintaining column statistics because they can track frequencies of values in large datasets using minimal memory, though with a bounded probability of error in the frequency estimates. The statistics maintenance tool 416 may maintain (e.g., create, store, update, and delete) the statistics in table statistics 424. In an example, the table statistics 424 may be stored in the database system 410.

The statistics maintenance tool 416 may implement adaptive sampling techniques to maintain statistical accuracy while minimizing computational overhead. When gathering statistics, the tool may employ stratified sampling strategies that ensure adequate representation of different value ranges. The sampling rates may be dynamically adjusted based on observed data patterns and query workload characteristics. For temporal data, the tool may maintain time-windowed statistics that capture evolving data distributions.

The statistics maintenance tool 416 may implement validation strategies for critical statistical properties that determine optimization safety. For example, to verify whether a column contains negative values, the tool may execute an optimized existence check that returns TRUE when the first negative value is found (e.g., using a query like "SELECT CASE WHEN EXISTS (SELECT 1 FROM table_name WHERE column_name <0 LIMIT 1) THEN TRUE ELSE FALSE END AS contains_negative"). This approach enables the statistics maintenance tool 416 to terminate the scan as soon as a single negative value is found, rather than analyzing the entire column.

For computed columns, the statistics maintenance tool 416 may implement propagation algorithms that derive statistical properties based on the underlying computation expressions. For example, if a computed column "total_cost" is defined as the product of two base columns "quantity" and "unit_price" (e.g., total_cost=quantity*unit_price), the statistics maintenance tool 416 can derive that total_cost will never contain negative values if both quantity and unit_price are known to be non-negative. The statistics maintenance tool 416 may maintain dependency graphs between base and computed columns to ensure that statistical updates are properly propagated when base column statistics change—for instance, if the statistics for the "quantity" column are updated to indicate it now contains negative values, the statistics maintenance tool 416 would automatically update the statistics for the dependent "total_cost" column to reflect that it may now contain negative values as well.

The query evaluation tool 418 analyzes incoming queries to determine whether they are candidates for transformation (e.g., optimization and rewrite). The query evaluation tool 418 examines query structures, detecting patterns that exhibit inefficiencies, such as multiple COUNT(DISTINCT) operations on the same dimensional column or redundant aggregation functions that can be rewritten into computationally efficient forms. For example, when analyzing a query containing multiple COUNT(DISTINCT) operations like "COUNT(DISTINCT CASE WHEN gdi_renderer_count >0 THEN user_node_id END)" and "COUNT(DISTINCT CASE WHEN d3d_renderer_count >0 THEN user_node_id END)," the query evaluation tool 418 first verifies that both operations are applied to the same dimensional column (user_node_id).

The query evaluation tool 418 may implement a rule-based and statistical assessment framework to classify queries into three categories: (1) rewritable queries that contain structures that can be automatically rewritten based on known optimization rules (COUNT(DISTINCT) conversions into a first combination of SUM( ) and COUNT( ) functions or a second combination of MAX( ) and SUM( ) functions), (2) potentially rewritable queries that might be optimized conditionally based on the availability of reliable column statistics (e.g., verifying that a column only contains non-negative values), and (3) non-rewritable queries that do not meet transformation criteria due to structural constraints or missing statistical information.

To support these classification decisions, the query evaluation tool 418 interacts with the statistics cache (i.e., the table statistics 424) to determine whether necessary metadata is available for performing safe transformations (e.g., rewrites). If statistical properties such as value distributions, minimum and maximum bounds, or distinct value counts are missing or outdated, the query evaluation tool 418 may trigger statistics collection to compute or refresh the necessary statistics before making a rewrite decision. For range-based conditions like "column >0", the tool confirms through statistical analysis that the column contains only non-negative values before approving transformation to SUM( ) operations.

Statistics may become stale when they no longer accurately reflect the current state of the data, such as when significant data changes occur after statistics were last computed. For example, if a column previously contained only non-negative values but recent data insertions included negative values, transformations that rely on the non-negativity criterion could produce incorrect results. To address this, the statistics maintenance tool 416 implements multiple safeguards. First, the statistics maintenance tool 416 may associate timestamps with statistical information to track when statistics were last computed. Second, the statistics maintenance tool 416 may monitor the rate and volume of data changes to identify when statistics might have become stale. Third, the statistics maintenance tool 416 may trigger automatic recomputation of statistics when certain thresholds are exceeded, such as when the number of modified rows exceeds a percentage of the total table size. These safeguards help ensure that query transformations are only performed using current and accurate statistical information.

In some implementations, the query evaluation tool 418 may integrate with an interactive developer interface (e.g., the IDE 404) that enables users to review query classification results and manually approve or override suggested optimizations. The query evaluation tool 418 may also implement a confidence scoring mechanism that quantifies the likelihood that a transformed query will perform more efficiently than the original, helping users make informed decisions about applying optimizations.

The query rewriting tool 420 is configured to implement a query transformation engine that operates on multiple levels of query representation. The tool may maintain an internal query representation using a directed acyclic graph (DAG) structure that captures both data flow and operation dependencies. This representation enables the query rewriting tool 420 to perform complex query transformations while preserving semantic correctness.

The query rewriting tool 420 may implement multiple optimization strategies tailored to different types of COUNT (DISTINCT) operations. For equality-based conditions, the query rewriting tool 420 may employ transformation rules that convert COUNT(DISTINCT) operations into equivalent MAX-based aggregations. For range-based conditions, the query rewriting tool 420 may implement transformations using SUM( ) operations when statistical properties permit. The tool may also handle complex cases involving multiple conditional columns with different operation types.

The runtime tool 422 serves as an interface between the query optimization software 402 and the query executor 412 of the database system 410. When a query has been analyzed and potentially rewritten by the query optimization software 402, the runtime tool 422 submits the final query to the query executor 412 for execution. For queries that have been rewritten, the runtime tool 422 ensures that the transformed query is properly formatted and includes all necessary components before submission to the query executor 412. The runtime tool 422 may also receive execution results from the query executor 412 and relay them back through the query optimization software 402 to the originating source (e.g., the IDE 404, source code control system 406, or executing application 408).

The table statistics 424 stores statistical information about tables and/or columns. Multiple types of statistics may be maintained, including basic column statistics (min/max values, distinct counts), detailed value distributions (histograms, frequency counts), and inter-column statistics (correlation coefficients, functional dependencies). In some implementations, the statistics maintenance tool 416 may use approximate statistics algorithms with probabilistic data structures to efficiently maintain statistics in the table statistics 424. For example, HyperLogLog, which is a probabilistic algorithm for estimating the number of distinct elements in a large dataset using a significantly smaller memory footprint than would be required to store the complete set of distinct values, may be used for estimating the number of distinct values in a column. Similarly, Count-Min Sketch, which is a probabilistic data structure for estimating frequencies of elements in a data stream using minimal memory, may be used for frequency estimation.

Approximate statistics may be particularly useful when determining whether a column containing COUNT(DISTINCT) operations is a candidate for optimization—for instance, if a HyperLogLog estimate indicates that a conditional column has a small number of distinct values (e.g., fewer than 100) and the Count-Min Sketch shows that none of these values are negative, the query evaluation tool 418 may determine that the query can be safely rewritten into a more efficient form using MAX( ) and SUM( ) operations, even without examining every value in the column.

In some implementations, the query optimization software 402 may perform optimizations during query compilation rather than at runtime. During query compilation, when the database system 410 analyzes a query and generates an execution plan, the query optimization software 402 may identify opportunities for transforming COUNT(DISTINCT) operations. By performing these optimizations during the query compilation phase, the system 400 can generate pre-optimized execution plans, avoiding runtime query modification overhead while maintaining flexibility for different query patterns.

The compilation-phase (e.g., query compilation phase) optimization may work in conjunction with the query rewriting tool 420 and statistics maintenance tool 416, which determine whether transformations are safe based on statistical properties of the relevant columns. If statistics indicate that a transformation would be unsafe, the original query form may be preserved in the compiled execution plan. The system 400 may also support dynamic or runtime query rewriting as a fallback mechanism. This may be useful in cases where statistical properties of the data may have changed since compilation or where compilation-time statistics were unavailable. Compilation-phase optimization can improve query performance by avoiding repeated analysis of the same query pattern during execution while ensuring that optimizations are applied only when safe.

For example, during the compilation of a query containing multiple COUNT(DISTINCT) operations on the same dimensional column, the query optimization software 402 may analyze the statistical properties of the conditional columns, determine whether transformation prerequisites are met (e.g., non-negative values for range conditions), and generate an execution plan that incorporates the optimized query form if appropriate. This compilation-phase optimization can improve query performance by avoiding repeated analysis of the same query pattern during execution while ensuring that optimizations are applied only when safe to do so.

In some implementations, the query optimization software 402 may incorporate artificial intelligence (AI) techniques to enhance optimization decisions and query transformations. The AI-based optimization component can analyze query patterns, statistical properties, and historical execution data to make intelligent decisions about query transformations. The AI component may include a machine learning model trained on historical query execution data, including query patterns, transformation decisions, and their outcomes. The machine learning model can predict whether a particular COUNT(DISTINCT) transformation will be beneficial based on various factors such as data distribution, query complexity, and system resource availability. For example, when analyzing a query containing multiple COUNT(DISTINCT) operations, the machine learning model may consider factors such as: historical performance of similar query patterns, current system resource utilization, statistical properties of involved columns, and/or query complexity and estimated cost.

The AI-based optimizer may also employ pattern recognition to identify complex query structures that could benefit from transformation. For instance, when encountering a query with multiple COUNT(DISTINCT) operations combined with various conditional filters, the AI component may analyze the query structure to identify transformation opportunities, evaluate statistical properties of relevant columns, consider historical performance data for similar query patterns, predict the effectiveness of different transformation strategies, and select the optimal transformation approach based on these factors.

FIGS. 5A-5B illustrate a first example of a query transformation that may be performed using a combination of aggregation operations. The combination of aggregation operations includes SUM( ) and MAX( ) FIG. 5A includes an original query 500 that a query optimization software, such as the query optimization software 402 of FIG. 4, rewrites into a transformed query 502.

The original query 500 counts distinct user_ids based on three different conditions: users who performed a login activity, users who made a purchase, and users who accessed from a mobile device. The query includes multiple COUNT (DISTINCT) operations (e.g., in aggregation operations 504), each applying a different condition to the same dimensional column (user_id).

FIG. 5A exemplifies a key optimization scenario where multiple COUNT(DISTINCT) operations reference the same dimensional column (user_id) but use different conditional columns (activity_type and device). The ability to handle different conditional columns in this way significantly expands the optimization's applicability beyond cases where all conditions reference the same column.

To rewrite the original query 500, the query optimization software may employ a two-step transformation process. First, a subquery 508 that groups data by user_id is created. This grouping ensures that the subsequent operations are applied at the user level. The subquery 508 then uses MAX( ) operations as binary flags to indicate whether each user meets each condition. For instance, MAX(CASE WHEN activity_type='LOGIN' THEN 1 ELSE 0 END) will return '1' if the user has any rows with 'LOGIN' activity and '0' otherwise. Second, SUM( ) operations are applied in an outer query 506 to count the total number of users meeting each condition. This transformation eliminates the need for expensive COUNT(DISTINCT) expansion operations while maintaining the same semantic meaning as the original query.

The query optimization software may rely on (e.g., use) statistics shown in FIG. 5B to determine whether this rewrite is safe and beneficial. Statistics 510 provide essential information about each column's properties, including whether it is categorical, its number of distinct values, and its NULL count. For example, the statistics 510 shows that user_id has a distinct value count of 1,000,000, confirming its uniqueness. Statistics 512 may provide detailed value distributions for the categorical columns. For instance, the statistics 512 indicate that 'LOGIN' is the most frequent value for activity_type, representing 50% of the data. The LAST_UPDATED timestamps in statistics 510 and 512 help ensure that the optimizer uses up-to-date information for making informed decisions.

Particularly the statistics 510 are relevant for equality-based conditions like those in the original query 500. Since the query uses only equality comparisons (e.g., activity_type='LOGIN'), the query optimization software does not need to verify non-negativity criterion of values, which would be crucial for range-based conditions. Instead, the statistics focus on three critical aspects: confirming user_id is a key column, validating that the conditional columns are categorical with well-defined value sets, and verifying the absence of NULL values that could affect the count accuracy.

The specific statistics in the statistics 510 and 512 can be used together to enable safe query transformation. The statistics 510 confirm the fundamental properties needed for the rewrite: categorical nature of activity_type and device, uniqueness of user_id, and absence of NULLs, which may not be crucial in this context. The statistics 512 may provide additional value distribution information usable to assess the effectiveness of the transformation, showing the frequency of each categorical value and helping determine if the rewrite will improve query performance.

Figure 6A:
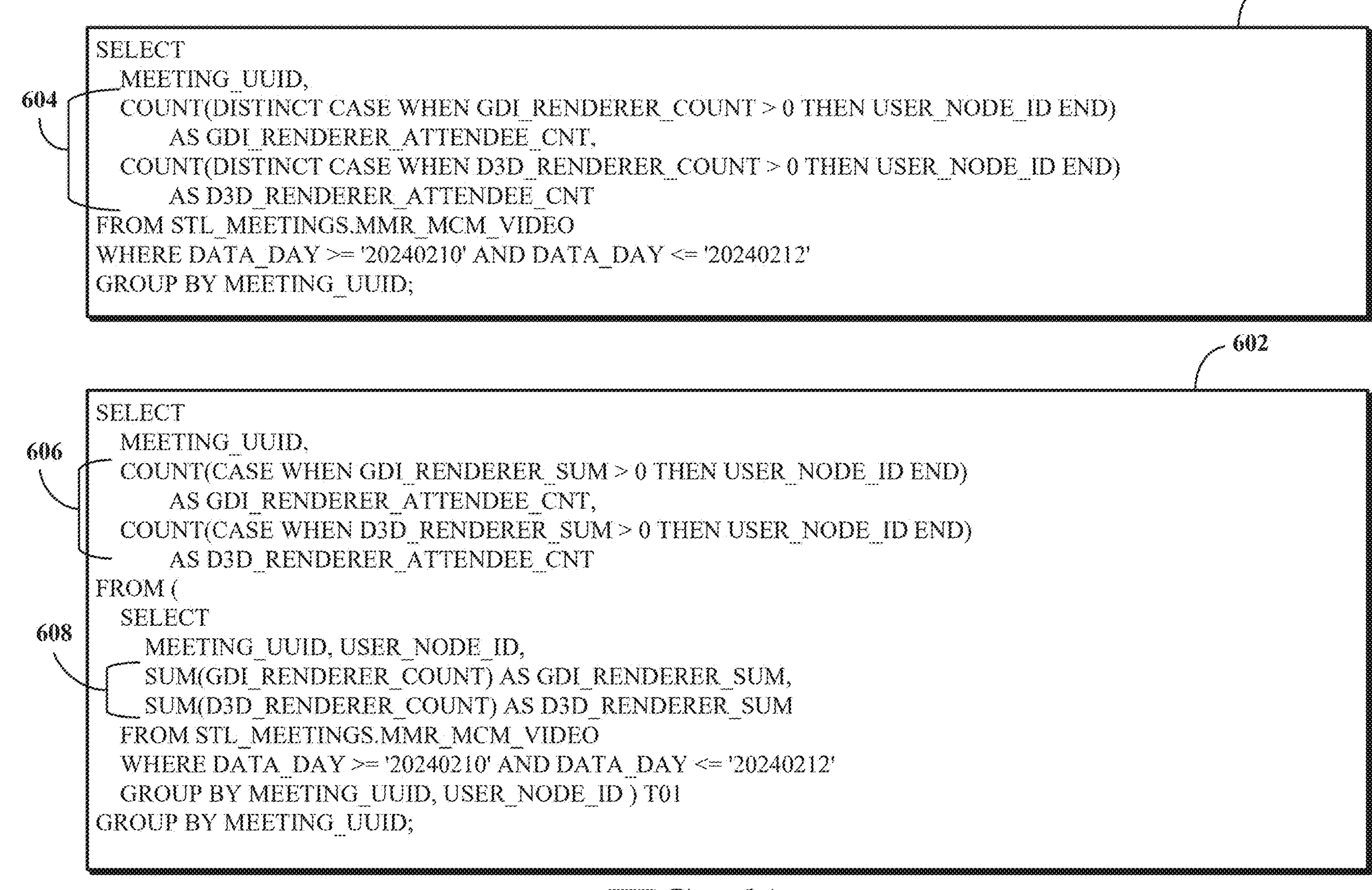

FIGS. 6A-6B illustrate a second example of a query transformation that may be performed using a combination of aggregation operations. The combination of aggregation operations includes SUM( ) and COUNT( ) FIG. 6A includes an original query 600 that a query optimization software, such as the query optimization software 402 of FIG. 4, rewrites into a transformed query 602.

The original query 600 analyzes meeting data to count distinct attendees based on their usage of different rendering methods. For example, the original query 600 includes two COUNT(DISTINCT) operations (e.g., in aggregation operations 604): (1) a first to count the number of distinct users who have utilized the GDI rendering method, indicated by a positive value for gdi_renderer_count, and (2) a second to count the number of distinct users who have utilized the D3D rendering method, indicated by a positive value for d3d_renderer_count.

Each of the aggregation operations 604 applies a different condition to the same dimensional column (user_node_id). This exemplifies a key optimization scenario where multiple COUNT(DISTINCT) operations reference the same dimensional column (user_node_id) but have different conditional columns (gdi_renderer_count and d3d_renderer_count).

To rewrite the original query 600, the query optimization software employs a two-step transformation process. First, a subquery 608 is created. The subquery 608 groups data by meeting_uuid and user_node_id and uses SUM( ) operations to aggregate gdi_renderer_count and d3d_renderer_count for each user. Second, COUNT( ) operations are applied in an outer query 606 to count the total number of users meeting the respective conditions (gdi_renderer_sum >0 and d3d_renderer_sum >0). This transformation eliminates the need for expensive multiple expansions of the COUNT (DISTINCT) operations while maintaining the same semantic meaning as the original query.

The query optimization software may rely on statistics shown in FIG. 6B to determine whether this rewrite is safe and beneficial. Statistics 610 provide minimum and maximum values for the relevant columns, as well as an indication of whether they contain negative values. Statistics 612 provide essential information about each column's properties, including whether it is categorical, its number of distinct values, and its NULL count.

Particularly the statistics 610 are relevant for the given conditions in the original query 600. Since the original query 600 involves greater-than comparisons (e.g., gdi_renderer_count >0), the query optimization software first verifies the non-negativity of values in these columns. This is crucial because the transformation relies on summing these values, and negative values could lead to incorrect results. The statistics 610 confirm that gdi_renderer_count and d3d_renderer_count do not contain negative values, making the rewrite safe. Additionally, the statistics 612 show that user_node_id is a key column with a high distinct value count, ensuring that each user is counted only once.

The statistics in 610 and 612 work together to enable safe and efficient query transformation. Statistics 610 confirm the non-negativity of the conditional columns, a crucial requirement for the SUM-based aggregation used in the rewrite. Statistics 612 provide additional information about the dimensional column (USER_NODE_ID), confirming its uniqueness and the absence of NULLs, which are essential for accurately counting distinct users.

To illustrate why negative values in renderer count columns can lead to incorrect results when using this optimization, consider a scenario where the gdi_renderer_count column contains both positive and negative values. To illustrate, a particular user may have associated therewith two rows for the same meeting, where in the first row meeting_uuid='meeting1', user_node_id='user1', and gdi_renderer_count=5, and in the second row the same user and meeting have gdi_renderer_count=−3.

In the original query 600, COUNT(DISTINCT CASE WHEN gdi_renderer_count >0 THEN user_node_id END) would count this user once because at least one row has gdi_renderer_count >0. In the transformed query 602, the subquery 608 would first SUM( ) the gdi_renderer_count values (5+(−3)=2) before the outer query 606 applies the COUNT( ) operation. While the transformed query still produces a correct result in this case because 2>0, if the second row instead had gdi_renderer_count=−5, the SUM( ) would be zero (5+(−5)=0), and the COUNT operation would not include this user because the sum is not >0. This would be incorrect since the user should be counted due to having at least one row where gdi_renderer_count >0. This demonstrates why the optimization requires statistics 610 confirming non-negative values in the renderer count columns before applying the transformation.

Figure 7:
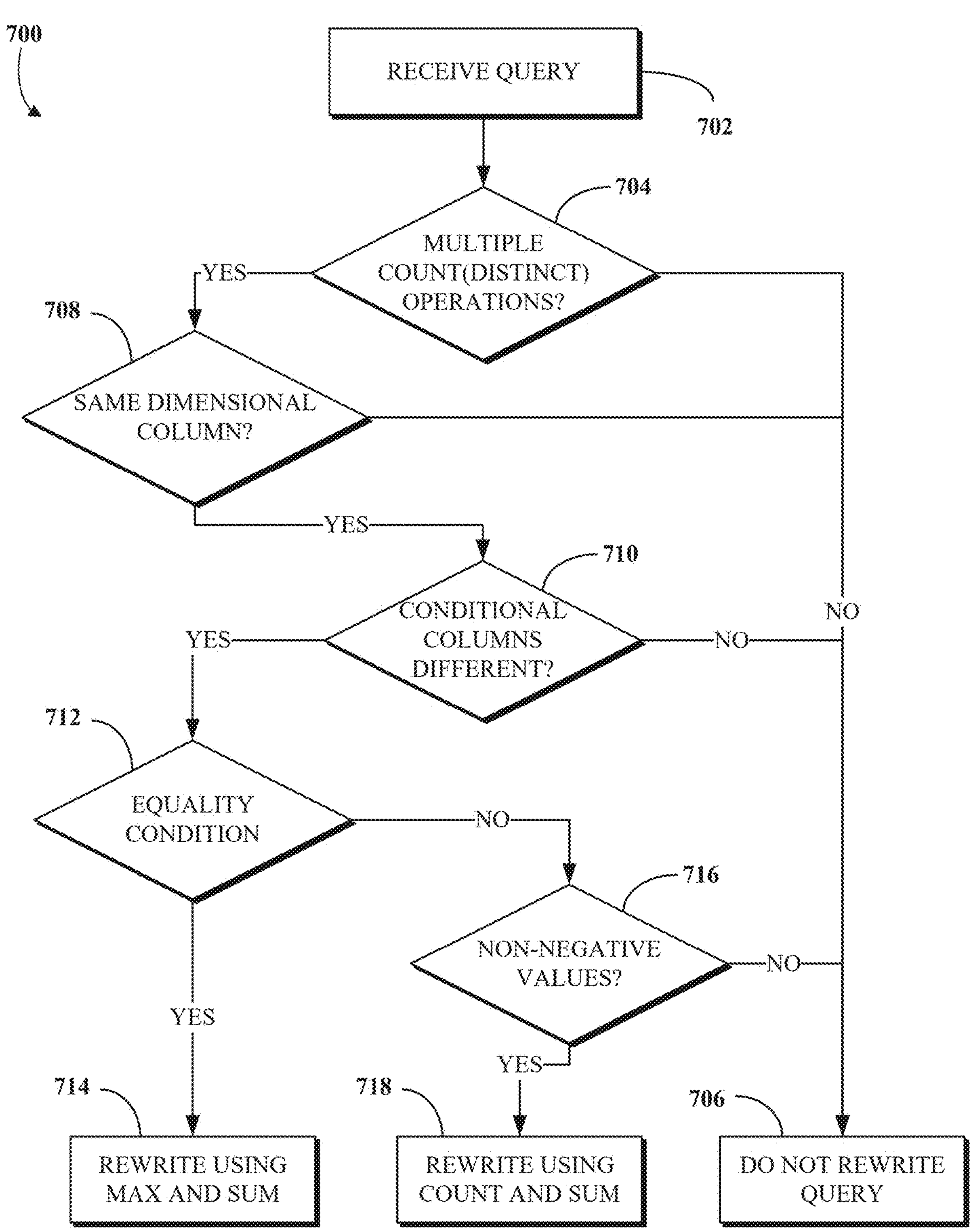
FIG. 7 is a flowchart of an example of a technique for query rewriting.

To further describe some implementations in greater detail, reference is next made to examples of techniques which may be performed by or using a system for performance optimization for COUNT(DISTINCT) operations in queries. FIG. 7 is a flowchart of an example of a technique 700 for query rewriting. The technique 700 can be executed using computing devices, such as the systems, hardware, and software described with respect to FIGS. 1-6B. The technique 700 can be performed, for example, by executing a machine-readable program or other computer-executable instructions, such as routines, instructions, programs, or other code. The steps, or operations, of the technique 700, or another technique, method, process, or algorithm described in connection with the implementations disclosed herein can be implemented directly in hardware, firmware, software executed by hardware, circuitry, or a combination thereof.

At 702, the technique 700 includes receiving a query. For example, a query optimization software, such as the query optimization software 402 shown in FIG. 4, may receive a database query from one or more of an IDE 404, a source code control system 406, or an executing application 408. In some implementations, the query may be received via a query executor 412 of a database system 410.

At 704, the technique 700 includes determining whether the received query includes multiple COUNT(DISTINCT) operations. For example, the query evaluation tool 418 may analyze the query structure to identify multiple COUNT (DISTINCT) operations, such as those shown in the original query 600 of FIG. 6A which includes COUNT(DISTINCT) operations for both gdi_renderer_count and d3d_renderer_count.

At 708, if multiple COUNT(DISTINCT) operations are identified, the technique 700 includes determining whether the COUNT(DISTINCT) operations operate on the same dimensional column. For example, the query evaluation tool 418 may analyze whether the COUNT(DISTINCT) operations reference the same column (e.g., user_node_id) as shown in the original query 500 of FIG. 5A and the original query 600 of FIG. 6A. In some implementations, this step may include analyzing column dependencies and relationships stored in table statistics 424.

At 710, if the COUNT(DISTINCT) operations operate on the same dimensional column, the technique 700 includes determining whether the conditional columns are different. For example, the query evaluation tool 418 may analyze whether each COUNT(DISTINCT) operation uses different conditional columns (e.g., gdi_renderer_count and d3d_renderer_count) as shown in the original query 600 of FIG. 6A.

At 712, if the conditional columns are different, the technique 700 includes determining whether equality conditions are used. For example, the query evaluation tool 418 may analyze whether the conditions use equality operations (e.g., column=value) as shown in FIG. 5A, or other operations such as greater-than operations (e.g., column >0) as shown in FIG. 6A.

At 714, if equality conditions are used, the technique 700 includes rewriting the query using MAX( ) and SUM( ) operations. For example, the query rewriting tool 420 may transform the query as shown in the transformed query 502 of FIG. 5A, where COUNT(DISTINCT) operations are rewritten using a combination of MAX( ) and SUM( ) operations.

The technique 700 identifies COUNT(DISTINCT) operations in the query and analyzes their filtering conditions to detect equality-based patterns. These equality conditions may be expressed in different ways, such as through CASE WHEN statements, direct equality comparisons, IN operators, or other SQL constructs that implement equality-based filtering. When multiple COUNT(DISTINCT) operations reference the same dimensional column but apply distinct equality-based filters, the technique restructures the query using a two-step transformation. In the first step, a subquery groups the data by the dimensional column and evaluates each filtering condition separately, assigning a binary flag using MAX( ) to indicate whether any row meets the condition. In the second step, the outer query aggregates these binary flags using SUM( ) effectively counting the distinct occurrences that satisfy each condition. By applying this transformation, the system reduces the need for maintaining multiple distinct counting sets while preserving the original query's logic, regardless of how the equality conditions were initially expressed.

At 716, if equality conditions are not used, the technique 700 includes determining whether the conditional columns contain only non-negative values. For example, the statistics maintenance tool 416 may check the table statistics 424, such as those shown in statistics 610 of FIG. 6B, to verify that the relevant columns do not contain negative values.

The technique 700 identifies COUNT(DISTINCT) operations in the query and analyzes their filtering conditions to detect non-equality comparison patterns, such as greater-than, less-than, or range conditions. These conditions may be expressed through various SQL constructs, including CASE WHEN statements, direct comparisons, BETWEEN operators, or other filtering mechanisms. Before applying a transformation, the technique 700 may verify that the columns involved in these comparisons contain only non-negative values by checking statistical properties stored in the table statistics. This validation guarantees the correctness of the transformation by confirming that negative values do not interfere with the aggregation results. If multiple COUNT(DISTINCT) operations reference the same dimensional column but apply different non-equality comparison conditions, and the statistical validation confirms the absence of negative values, the technique 700 restructures the query using a two-step transformation. In the first step, a subquery groups the data by both the dimensional column and any other relevant grouping keys and applies SUM( ) to aggregate the values being compared. In the second step, the outer query applies COUNT( ) to determine how many distinct dimensional values have aggregated sums that satisfy each comparison condition. This transformation preserves the semantic intent of the original query while avoiding multiple data expansions, ensuring efficiency without compromising correctness.

In some implementations, if statistics are not available or are outdated, the statistics maintenance tool 416 may generate new statistics at this point in the technique 700.

At 718, if the conditional columns contain only non-negative values, the technique 700 includes rewriting the query using COUNT( ) and SUM( ) operations. For example, the query rewriting tool 420 may transform the query as shown in the transformed query 602 of FIG. 6A, where COUNT(DISTINCT) operations are rewritten using a combination of COUNT( ) and SUM( ) operations.

At 706, the technique 700 includes not rewriting the query if any of the previous conditions are not met. For example, if multiple COUNT(DISTINCT) operations are not present, if they do not operate on the same dimensional column, if the conditional columns are not different, or if non-equality conditions are used with columns containing negative values, the query optimization software 402 may pass the original query to the query executor 412 without modification.

In some implementations of the technique 700, statistics about the conditional columns may be pre-generated and stored in the table statistics 424. These statistics may include information such as minimum values, maximum values, whether columns contain negative values, and other metadata as shown in statistics 610 and 612 of FIG. 6B. The statistics maintenance tool 416 may generate or update these statistics when new data is ingested, when statistics become outdated, or when statistics are missing for columns involved in a query being analyzed.

After determining whether and how to rewrite the query, in some implementations, the runtime tool 422 may transmit the resulting query (either the original query or the transformed query) to the query executor 412 of the database system 410 for execution. The query executor 412 may then execute the query and return results to the originating source, such as the IDE 404, source code control system 406, or executing application 408.

Alternative implementations of the technique 700 may include additional decision points for other types of operations beyond equality and greater-than comparisons, such as less-than operations or IN operators. The technique may also incorporate different types of statistical analysis, such as analyzing a value distribution criterion, distinct value counts criteria, or correlation between columns criteria. In some implementations, the technique may include additional optimization paths for other types of query transformations beyond those shown in FIG. 7.

Figure 8:
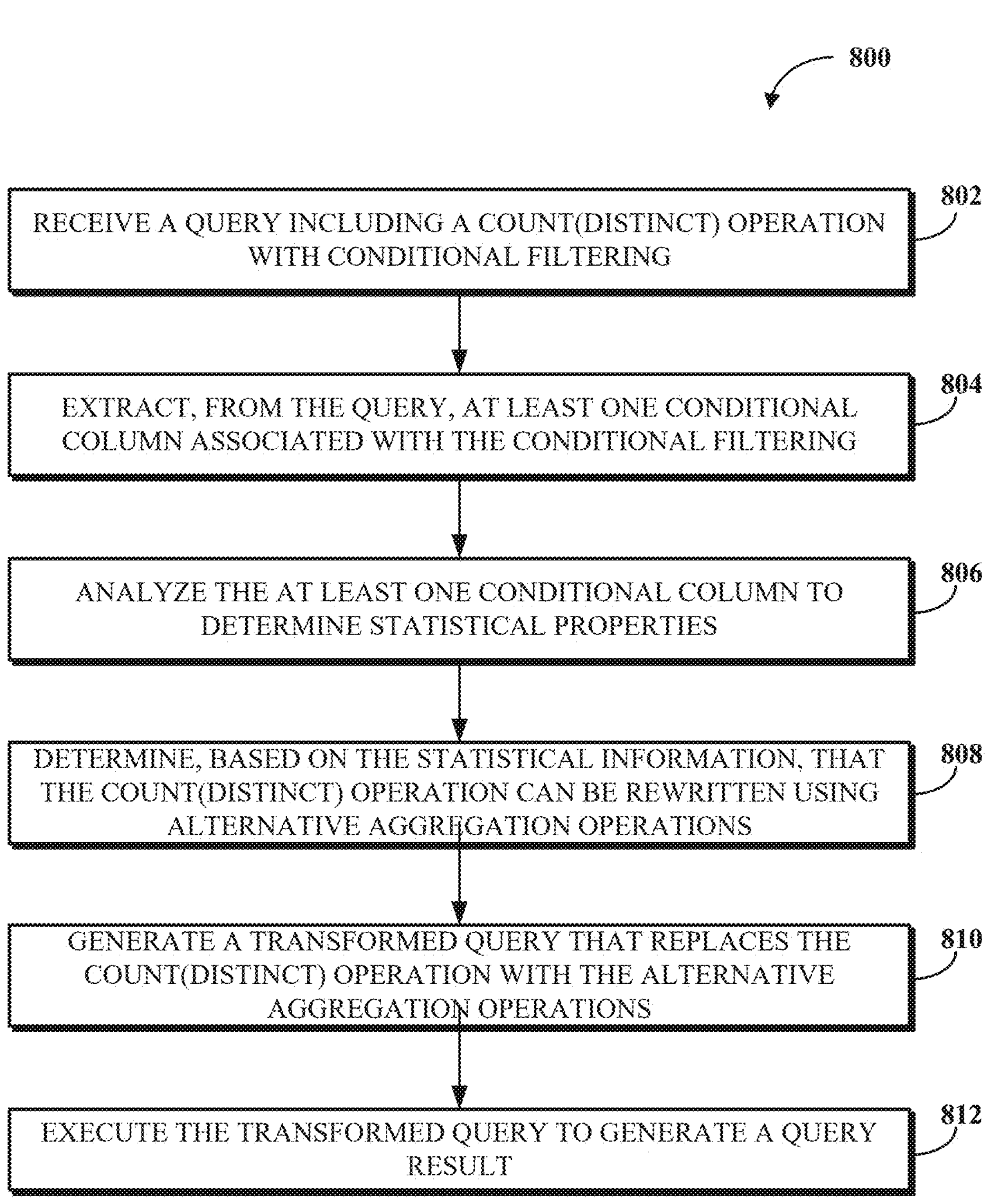
FIG. 8 is a flowchart of another example of a technique for query rewriting.

FIG. 8 is a flowchart of an example of a technique 800 for query rewriting. The technique 800 can be executed using computing devices, such as the systems, hardware, and software described with respect to FIGS. 1-6B. The technique 800 can be performed, for example, by executing a machine-readable program or other computer-executable instructions, such as routines, instructions, programs, or other code. The steps, or operations, of the technique 800, or another technique, method, process, or algorithm described in connection with the implementations disclosed herein can be implemented directly in hardware, firmware, software executed by hardware, circuitry, or a combination thereof.

At 802, the technique 800 includes receives a query including a COUNT(DISTINCT) operation with conditional filtering. For example, the query evaluation tool 418 of FIG. 4 may receive a query including a COUNT(DISTINCT) operation with conditional filtering. To illustrate, in a query that includes "COUNT(DISTINCT CASE WHEN gdi_renderer_count >0 THEN user_node_id END)," the "CASE WHEN gdi_renderer_count >0 THEN user_node_id END" statement applies a condition to select specific rows for counting. At 804, the technique 800 includes extracting, from the query, at least one conditional column associated with the conditional filtering. For example, the query evaluation tool 418 of FIG. 4 may extract, from the query, at least one conditional column associated with the conditional filtering. In some alternative implementations, multiple conditional columns may be extracted.

At 806, the technique 800 includes analyzing the at least one conditional column to determine statistical properties. The statistical properties may include whether the at least one conditional column contains negative values, the distribution of values, or other characteristics that affect whether query transformation would be safe. For example, the statistics maintenance tool 416 may analyze the conditional column to generate this statistical information. In some implementations, the statistical information may be maintained in a statistics cache, such as the table statistics 424 of FIG. 4.

At 808, the technique 800 includes determining, based on the statistical information, that the COUNT(DISTINCT) operation can be rewritten using alternative aggregation operations. For example, the query evaluation tool 418 of FIG. 4 may determine, based on the statistical information, that the COUNT(DISTINCT) operation can be rewritten using alternative aggregation operations. In some implementations, the alternative aggregation operations may include a first combination of SUM( ) and COUNT( ) functions or a second combination of MAX( ) and SUM( ) functions. At 810, the technique 800 includes generating a transformed query that replaces the COUNT(DISTINCT) operation with the alternative aggregation operations. For example, the query rewriting tool 420 of FIG. 4 may generate a transformed query that replaces the COUNT(DISTINCT) operation with the alternative aggregation operations.

At 812, the technique 800 includes executing the transformed query to generate a query result. For example, the query executor 412 of FIG. 4 may execute the transformed query to generate a query result. Executing the transformed query may include transmitting the transformed query, such as to a database system or a query executor therein, for execution to generate a query result.

Figure 9:
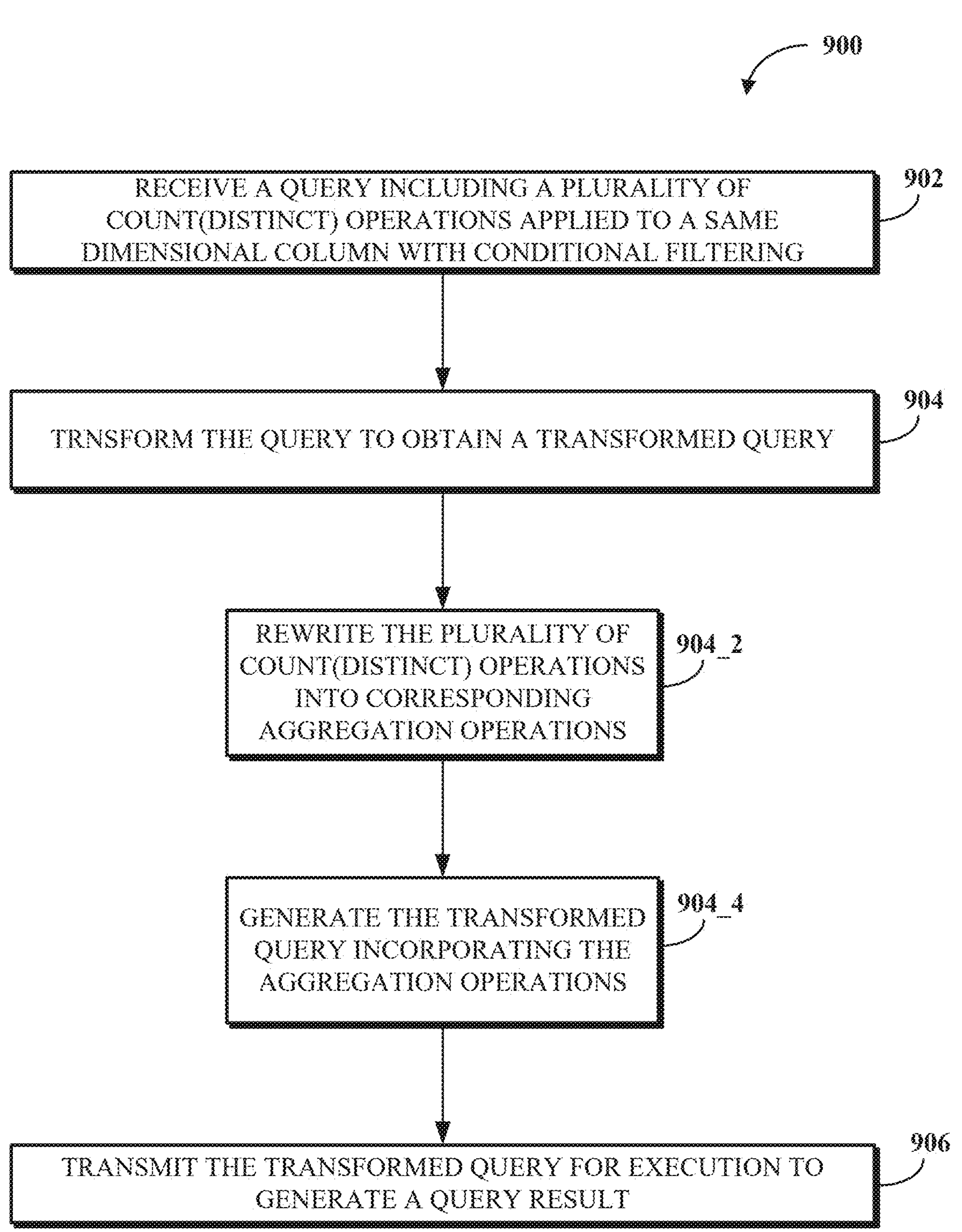
FIG. 9 is a flowchart of an example of a technique for performance optimization of queries that include multiple COUNT(DISTINCT) operations.

FIG. 9 is a flowchart of an example of a technique 900 for performance optimization of queries that include multiple COUNT(DISTINCT) operations. The technique 900 can be executed using computing devices, such as the systems, hardware, and software described with respect to FIGS. 1-6B. The technique 900 can be performed, for example, by executing a machine-readable program or other computer-executable instructions, such as routines, instructions, programs, or other code. The steps, or operations, of the technique 900, or another technique, method, process, or algorithm described in connection with the implementations disclosed herein can be implemented directly in hardware, firmware, software executed by hardware, circuitry, or a combination thereof.

At 902, the technique 900 includes receiving a query including a plurality of COUNT(DISTINCT) operations applied to a same dimensional column with conditional filtering. For example, a query optimization software, such as the query optimization software 402 shown in FIG. 4, may identify SQL statements where COUNT(DISTINCT) is applied to the same user identifier (user_id) but with different conditional filters. The conditional filtering may be applied to columns having data types selected from the group consisting of: string, number, and Boolean. In some implementations, the conditional filtering may include operations such as equality operations, greater-than operations, less-than operations, and set membership operations (e.g., IN operator), range operations, and pattern matching operations.

At 904, the technique 900 includes transforming the query to obtain a transformed query. This transformation may occur during a query compilation phase. The transforming may involve determining whether values in a conditional column associated with the conditional filtering satisfy a statistical criterion or criteria. These criteria may include a non-negativity criterion of values (i.e., determining whether the conditional column contains any negative values) or uniqueness of values. To support this analysis, a statistics cache storing statistical properties of columns in the database may be maintained and the statistical criterion may be retrieved from this cache.

The technique 900 may also handle queries containing COUNT(DISTINCT) operations applied to different dimensional columns. In such cases, the technique 900 identifies these additional COUNT(DISTINCT) operations and analyzes each one separately. For each different dimensional column, the technique determines whether its corresponding conditional column values satisfy the respective statistical criteria. This allows for selective transformation, where only those COUNT(DISTINCT) operations whose statistical criteria are satisfied are transformed, while maintaining the original COUNT(DISTINCT) operations where the criteria are not satisfied. For example, in a query analyzing both user interactions and device metrics, COUNT(DISTINCT user_id) operations might be transformed if user_id-related statistics satisfy the criteria, while COUNT(DISTINCT device_id) operations might remain unchanged if device_id-related statistics do not meet the transformation requirements.

The transformation process includes two sub-steps at 904_2 and 904_4. At 904_2, the technique 900 rewrites the plurality of COUNT(DISTINCT) operations into corresponding aggregation operations using either a first combination of SUM( ) and COUNT( ) or a second combination using SUM( ) and MAX( ) The aggregation operations are selected based on operation types in the conditional filtering, and in some implementations, may include replacing at least one COUNT(DISTINCT) operation with a MAX( ) operation. When rewriting operations, the technique 900 may analyze statistical properties of the conditional column and select an alternative aggregation operation from a set comprising MIN( ), MAX( ), SUM( ), COUNT( ), and APPROX_COUNT_DISTINCT based on the statistical properties.

The technique 900 may validate statistical information through several mechanisms. The technique 900 may determine whether the statistics cache includes valid statistical information for the conditional column, and when valid information does not exist, generates and stores new statistical information. The technique 900 may associate timestamps with statistical information stored in the cache and determines validity based on these timestamps. The technique 900 may monitor changes in data distribution of the conditional column and invalidates previously generated statistical information when the data distribution changes beyond a threshold. To illustrate, if a conditional column account_balance initially has 95% non-negative values but new data insertions cause the percentage of non-negative values to drop below 80% (the configured threshold), the technique 900 may invalidate the previously generated statistics because the fundamental assumption about value distribution has significantly changed. Similarly, if the cardinality (number of distinct values) in a column increases by more than 50% from when the statistics were last computed, this could trigger invalidation since it indicates a significant shift in the column's characteristics that might affect query optimization decisions.

At 904_4, the technique 900 generates the transformed query incorporating the aggregation operations. For computed columns derived from base columns, the technique 900 analyzes the statistical properties of the base columns and determines whether the computed column preserves these properties. This analysis can be useful when the computed column is defined by arithmetic expressions, user-defined functions, or conditional expressions. The technique 900 may generate optimization plans specifying which COUNT(DISTINCT) operations to transform and store these plans for future use with similar queries. When the conditional filtering includes multiple conditions combined using logical operators, the technique 900 may analyze each condition separately to determine appropriate transformation strategies.

At 906, the technique 900 includes transmitting the transformed query for execution to generate a query result. The transformed query may be executed using an adaptive query execution engine that can adjust the query plan during runtime, and typically reduces memory consumption compared to the received query. The database may comprise data stored across multiple nodes of a distributed computing system, requiring careful coordination of query execution across nodes.

The technique 900 may employ several optimization strategies during execution. The technique 900 may analyze query patterns to identify frequently occurring COUNT (DISTINCT) operations and precomputes statistical information for associated conditional columns. When identifying additional COUNT(DISTINCT) operations applied to different dimensional columns, the technique 900 may determine whether corresponding conditional column values satisfy respective statistical criteria. This may result in generating a hybrid query that includes both transformed aggregation operations and original COUNT(DISTINCT) operations, with the execution order optimized to minimize data expansion.

Figure 10:
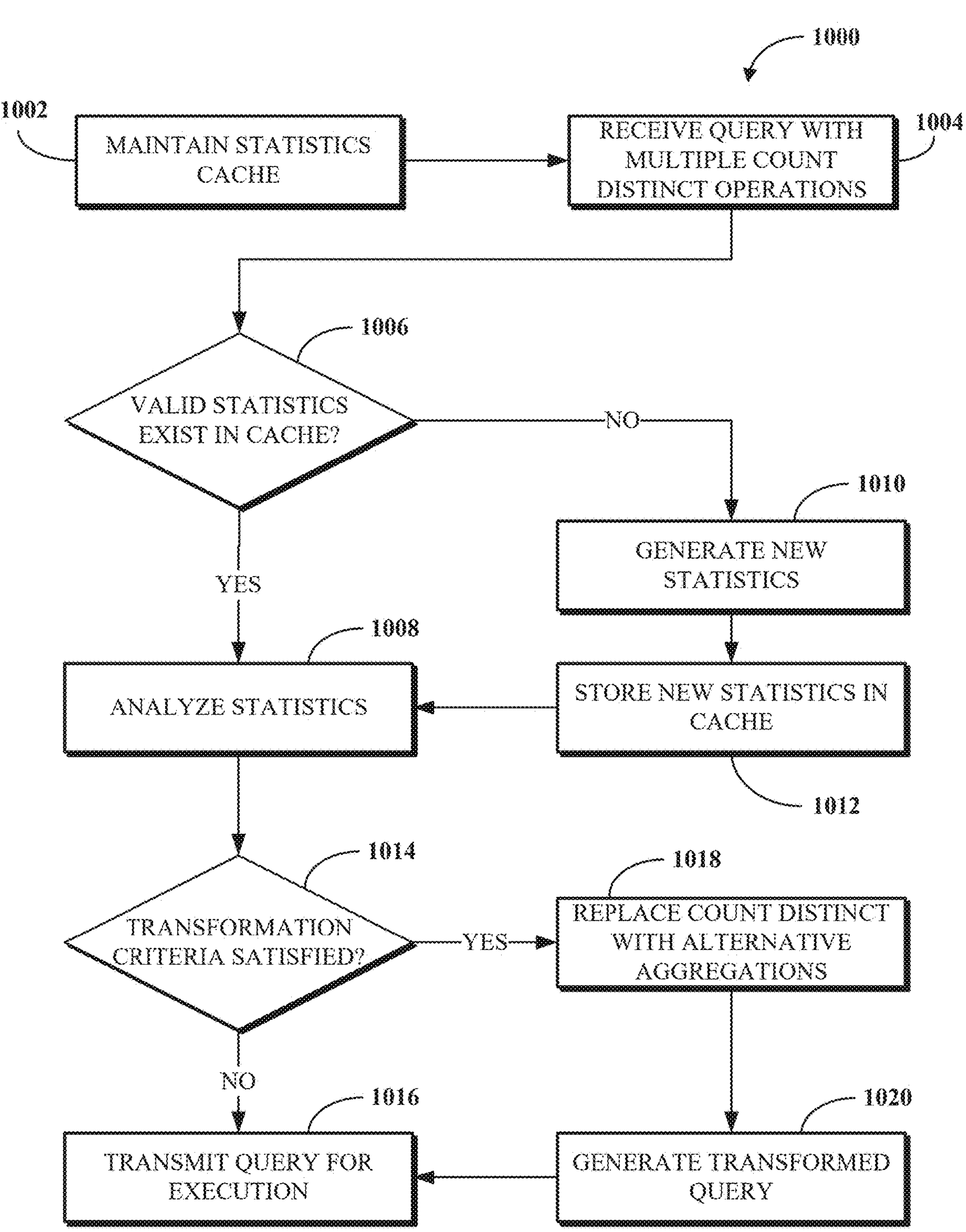
FIG. 10 is a flowchart of an example of another technique for performance optimization of queries that include multiple COUNT(DISTINCT) operations.

FIG. 10 is a flowchart of an example of a technique 1000 for performance optimization of queries that include multiple COUNT(DISTINCT) operations. The technique 1000 can be executed using computing devices, such as the systems, hardware, and software described with respect to FIGS. 1-6B. The technique 1000 can be performed, for example, by executing a machine-readable program or other computer-executable instructions, such as routines, instructions, programs, or other code. The steps, or operations, of the technique 1000, or another technique, method, process, or algorithm described in connection with the implementations disclosed herein can be implemented directly in hardware, firmware, software executed by hardware, circuitry, or a combination thereof.

At 1002, the technique 1000 includes maintaining a statistics cache storing statistical properties of columns in a database. For example, the statistics maintenance tool 416 may maintain statistical information about database columns in the table statistics 424. At 1004, the technique 1000 includes receiving a query with multiple COUNT(DISTINCT) operations. For example, the query evaluation tool 418 may receive a database query containing multiple COUNT(DISTINCT) operations for analysis. At 1006, the technique 1000 includes determining whether valid statistics exist in cache. For example, the statistics maintenance tool 416 may check whether current and valid statistics exist in the table statistics 424 for the columns involved in the query. If valid statistics exist, the technique 1000 proceeds to 1008. At 1008, the technique 1000 includes analyzing the statistics. For example, the query evaluation tool 418 may analyze the statistical properties of the relevant columns to determine if query transformation is possible. If valid statistics do not exist, the technique 1000 proceeds from 1006 to 1010. At 1010 and 1012, the technique 1000 includes generating new statistics and storing them in the statistics cache. For example, the statistics maintenance tool 416 may generate new statistical information for the relevant columns and store it in the table statistics 424.

At 1014, the technique 1000 includes determining whether transformation criteria are satisfied. For example, the query evaluation tool 418 may evaluate whether the statistical properties meet the requirements for safe query transformation. If transformation criteria are not satisfied, the technique 1000 proceeds to 1016; otherwise, the technique 1000 proceeds to 1018.

At 1018 and 1020, the technique 1000 includes replacing COUNT(DISTINCT) with alternative aggregations (alternative aggregation operations) and generating a transformed query. For example, the query rewriting tool 420 may transform the COUNT(DISTINCT) operations into alternative aggregation operations and generate an optimized query. At 1016, the technique 1000 includes transmitting the query for execution. If transformation criteria are not satisfied, the original query is transmitted; if criteria are satisfied, the transformed query is transmitted. For example, the runtime tool 422 may transmit either the original or transformed query to the query executor 412 for execution.

For simplicity of explanation, the techniques 700, 800, 900, and 1000 of FIGS. 7, 8, 9, and 10 respectively, are each depicted and described herein as a respective series of steps or operations. However, the steps or operations of the techniques 700, 800, 900, and 1000 in accordance with this disclosure can occur in various orders and/or concurrently. Additionally, other steps or operations not presented and described herein may be used. Furthermore, not all illustrated steps or operations may be required to implement a technique in accordance with the disclosed subject matter.

Some implementations are described below as numbered examples (Example 1, 2, 3, etc.). These examples are provided as examples only and do not limit the other implementations disclosed herein.

Example 1 is a method that includes receiving a query including a plurality of COUNT(DISTINCT) operations applied to a same dimensional column with conditional filtering; transforming the query to obtain a transformed query by rewriting the plurality of COUNT(DISTINCT) operations into aggregation operations using a first combination of SUM( ) and COUNT( ) or a second combination using SUM( ) and MAX( ) generating the transformed query incorporating the aggregation operations; and transmitting the transformed query to a database system for execution to generate a query result.

Example 2 is the method of Example 1 where transforming the query to obtain the transformed query includes: determining whether values in a conditional column associated with the conditional filtering satisfy a statistical criterion; and responsive to determining that the values satisfy the statistical criterion, transforming the query.

Example 3 is the method of Example 2 where the COUNT(DISTINCT) operations are applied to a computed column derived from one or more base columns in the database system, and where determining whether values satisfy the statistical criterion includes: analyzing statistical properties of the base columns; determining whether the computed column preserves the statistical properties of the base columns; and evaluating the statistical criterion based on the statistical properties.

Example 4 is the method of Example 1 further including identifying, within the query, additional COUNT(DISTINCT) operations applied to different dimensional columns; determining, for each different dimensional column, whether corresponding conditional column values satisfy respective statistical criteria; selectively transforming only those COUNT(DISTINCT) operations where the respective statistical criteria are satisfied; and maintaining original COUNT(DISTINCT) operations where the respective statistical criteria are not satisfied.

Example 5 is the method of Example 4 where selectively transforming includes generating a hybrid query that includes both transformed aggregation operations and original COUNT(DISTINCT) operations.

Example 6 is the method of Example 2 where rewriting the plurality of COUNT(DISTINCT) operations includes: analyzing statistical properties of the conditional column; selecting an alternative aggregation operation from a set including MIN( ), MAX( ), SUM( ), COUNT( ), and APPROX_COUNT_DISTINCT( ) based on the statistical properties; and replacing at least one COUNT(DISTINCT) operation with the alternative aggregation operation.

Example 7 is the method of Example 1 where rewriting the plurality of COUNT(DISTINCT) operations includes replacing at least one COUNT(DISTINCT) operation with a MAX( ) operation.

Example 8 is the method of Example 1 where the conditional filtering includes at least one operation selected from the group including equality operations, greater-than operations, less-than operations, and IN operations.

Example 9 is a system that includes a memory subsystem and processing circuitry. The processing circuitry is configured to execute instructions stored in the memory subsystem to receive a query including a plurality of COUNT(DISTINCT) operations applied to a same dimensional column with conditional filtering; transform the query to obtain a transformed query by rewriting the plurality of COUNT (DISTINCT) operations into aggregation operations using a first combination of SUM( ) and COUNT( ) or a second combination using SUM( ) and MAX( ); generating the transformed query incorporating the aggregation operations; and transmitting the transformed query to a database system for execution to generate a query result.

Example 10 is the system of Example 9 where to transform the query to obtain the transformed query, the processing circuitry is further configured to: determine whether values in a conditional column associated with a conditional filtering satisfy a statistical criterion; and responsive to determining that the values satisfy the statistical criterion, transform the query.

Example 11 is the system of Example 10 where to determine whether values in the conditional column satisfy the statistical criterion, the processing circuitry is further configured to determine whether the conditional column contains any negative values, where the statistical criterion is non-negativity of values.

Example 12 is the system of Example 10 where the statistical criterion includes a criterion selected from a group including non-negativity of values and uniqueness of values.

Example 13 is the system of Example 10 where the processing circuitry is further configured to execute instructions stored in the memory subsystem to: maintain a statistics cache storing statistical properties of columns in the database system; and retrieve the statistical criterion from the statistics cache.

Example 14 is the system of Example 10 where to determine whether values satisfy the statistical criterion, the processing circuitry is further configured to: extract, from the query, at least one conditional column associated with the conditional filtering; and analyze the at least one conditional column to determine statistical properties, where the statistical properties include at least whether the conditional column contains negative values.

Example 15 is one or more non-transitory computer readable media storing instructions operable to cause one or more processors to perform operations including: receiving a query including a plurality of COUNT(DISTINCT) operations applied to a same dimensional column with conditional filtering; transforming the query to obtain a transformed query by rewriting the plurality of COUNT(DISTINCT) operations into aggregation operations using a first combination of SUM( ) and COUNT( ) or a second combination using SUM( ) and MAX( ); generating the transformed query incorporating the aggregation operations; and transmitting the transformed query to a database system for execution to generate a query result.

Example 16 is the one or more non-transitory computer readable media of Example 15 where transforming the query to obtain the transformed query includes: determining whether values in a conditional column associated with the conditional filtering satisfy a plurality of statistical criteria, the plurality of statistical criteria including at least a non-negativity criterion and a value distribution criterion; and responsive to determining that the values satisfy all of the plurality of statistical criteria, transforming the query.

Example 17 is the one or more non-transitory computer readable media of Example 15 further including: analyzing the query to identify a first set of COUNT(DISTINCT) operations applied to a first dimensional column and a second set of COUNT(DISTINCT) operations applied to a second dimensional column; determining optimization paths for each of the first set of COUNT(DISTINCT) operations and the second set of COUNT(DISTINCT) operations based on statistical properties of respective dimensional columns; transforming the first set of COUNT(DISTINCT) operations when the statistical properties of the first dimensional column satisfy a first set of criteria; transforming the second set of COUNT(DISTINCT) operations when the statistical properties of the second dimensional column satisfy a second set of criteria; and maintaining original COUNT(DISTINCT) operations for any set where respective statistical properties do not satisfy corresponding statistical criteria.

Example 18 is the one or more non-transitory computer readable media of Example 15 where the conditional filtering includes a plurality of comparison operations; where the comparison operations include at least two types of operations selected from equality operations, range operations, pattern matching operations, and set membership operations; and where transforming the query includes selecting different aggregation operations based on types of comparison operations present in the conditional filtering.

Example 19 is the one or more non-transitory computer readable media of Example 15 where the aggregation operations are selected based on operation types in the conditional filtering.

Example 20 is the one or more non-transitory computer readable media of Example 15 where the conditional filtering includes multiple conditions combined using logical operators.

As used herein, unless explicitly stated otherwise, any term specified in the singular may include its plural version. For example, "a computer that stores data and runs software," may include a single computer that stores data and runs software or two computers—a first computer that stores data and a second computer that runs software. Also "a computer that stores data and runs software," may include multiple computers that together stored data and run software. At least one of the multiple computers stores data, and at least one of the multiple computers runs software.

As used herein, the term "computer-readable medium" encompasses one or more computer readable media. A computer-readable medium may include any storage unit (or multiple storage units) that store data or instructions that are readable by processing circuitry. A computer-readable medium may include, for example, at least one of a data repository, a data storage unit, a computer memory, a hard drive, a disk, or a random access memory. A computer-readable medium may include a single computer-readable medium or multiple computer-readable media. A computer-readable medium may be a transitory computer-readable medium or a non-transitory computer-readable medium.

As used herein, the term "memory subsystem" includes one or more memories, where each memory may be a computer-readable medium. A memory subsystem may encompass memory hardware units (e.g., a hard drive or a disk) that store data or instructions in software form. Alternatively or in addition, the memory subsystem may include data or instructions that are hard-wired into processing circuitry.

As used herein, processing circuitry includes one or more processors. The one or more processors may be arranged in one or more processing units, for example, a central processing unit (CPU), a graphics processing unit (GPU), or a combination of at least one of a CPU or a GPU.

As used herein, the term "engine" may include software, hardware, or a combination of software and hardware. An engine may be implemented using software stored in the memory subsystem. Alternatively, an engine may be hard-wired into processing circuitry. In some cases, an engine includes a combination of software stored in the memory subsystem and hardware that is hard-wired into the processing circuitry.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:

receiving, during runtime execution of an executing application, a query including a plurality of COUNT(DISTINCT) operations applied to a same dimensional column with conditional filtering;

transforming the query to obtain a transformed query by:

retrieving statistical properties of columns in a database system, the statistical properties including one or more of value distributions, cardinality estimates, null value frequencies, or minimum and maximum values of the columns;

rewriting the plurality of COUNT(DISTINCT) operations into aggregation operations using a first combination of SUM( ) and COUNT( ) or a second combination using SUM( ) and MAX( ) based on the statistical properties; and generating the transformed query incorporating the aggregation operations;

transmitting the transformed query to the database system for execution to generate a query result; and transmitting the query result to the executing application.

2. The method of claim 1, wherein transforming the query to obtain the transformed query comprises:

determining whether values in a conditional column associated with the conditional filtering satisfy a statistical criterion; and responsive to determining that the values satisfy the statistical criterion, transforming the query.

3. The method of claim 2, wherein the COUNT(DISTINCT) operations are applied to a computed column derived from one or more base columns in the database system, and wherein determining whether values satisfy the statistical criterion comprises:

analyzing statistical properties of the base columns;

determining whether the computed column preserves the statistical properties of the base columns; and evaluating the statistical criterion based on the statistical properties.

4. The method of claim 1, further comprising:

identifying, within the query, additional COUNT(DISTINCT) operations applied to different dimensional columns;

determining, for each different dimensional column, whether corresponding conditional column values satisfy respective statistical criteria;

selectively transforming only those COUNT(DISTINCT) operations where the respective statistical criteria are satisfied; and maintaining original COUNT(DISTINCT) operations where the respective statistical criteria are not satisfied.

5. The method of claim 4, wherein selectively transforming comprises:

generating a hybrid query that includes both transformed aggregation operations and original COUNT(DISTINCT) operations.

6. The method of claim 2, wherein rewriting the plurality of COUNT(DISTINCT) operations comprises:

analyzing statistical properties of the conditional column;

selecting an alternative aggregation operation from a set comprising MIN( ), MAX( ), SUM( ), COUNT( ), and APPROX_COUNT_DISTINCT( ) based on the statistical properties; and replacing at least one COUNT(DISTINCT) operation with the alternative aggregation operation.

7. The method of claim 1, wherein rewriting the plurality of COUNT(DISTINCT) operations comprises replacing at least one COUNT(DISTINCT) operation with a MAX( ) operation.

8. The method of claim 1, wherein the conditional filtering includes at least one operation selected from the group consisting of: equality operations, greater-than operations, less-than operations, and IN operations.

9. A system, comprising:

a memory subsystem; and processing circuitry, the processing circuitry configured to execute instructions stored in the memory subsystem to:

receive, during runtime execution of an executing application, a query including a plurality of COUNT (DISTINCT) operations applied to a same dimensional column with conditional filtering;

transform the query to obtain a transformed query by instructions to:

retrieve statistical properties of columns in a database system, the statistical properties including one or more of value distributions, cardinality estimates, null value frequencies, or minimum and maximum values of the columns;

rewrite the plurality of COUNT(DISTINCT) operations into aggregation operations using a first combination of SUM( ) and COUNT( ) or a second combination using SUM( ) and MAX( ) based on the statistical properties; and generate the transformed query incorporating the aggregation operations;

transmit the transformed query to the database system for execution to generate a query result; and transmit the query result to the executing application.

10. The system of claim 9, wherein to transform the query to obtain the transformed query, the processing circuitry is further configured to:

determine whether values in a conditional column associated with a conditional filtering satisfy a statistical criterion; and responsive to determining that the values satisfy the statistical criterion, transform the query.

11. The system of claim 10, wherein to determine whether values in the conditional column satisfy the statistical criterion, the processing circuitry is further configured to:

determine whether the conditional column contains any negative values, wherein the statistical criterion is non-negativity of values.

12. The system of claim 10, wherein the statistical criterion comprises a criterion selected from a group comprising non-negativity of values and uniqueness of values.

13. The system of claim 10, wherein the processing circuitry is further configured to execute instructions stored in the memory subsystem to:

maintain a statistics cache storing the statistical properties of columns in the database system.

14. The system of claim 10, wherein to determine whether values satisfy the statistical criterion, the processing circuitry is further configured to:

extract, from the query, at least one conditional column associated with the conditional filtering; and analyze the at least one conditional column to determine statistical properties, wherein the statistical properties include at least whether the conditional column contains negative values.

15. One or more non-transitory computer readable media storing instructions operable to cause one or more processors to perform operations comprising:

receiving, during runtime execution of an executing application, a query including a plurality of COUNT(DISTINCT) operations applied to a same dimensional column with conditional filtering;

transforming the query to obtain a transformed query by:

retrieving statistical properties of columns in a database system, the statistical properties including one or more of value distributions, cardinality estimates, null value frequencies, or minimum and maximum values of the columns;

rewriting the plurality of COUNT(DISTINCT) operations into aggregation operations using a first combination of SUM( ) and COUNT( ) or a second combination using SUM( ) and MAX( ) based on the statistical properties; and generating the transformed query incorporating the aggregation operations;

transmitting the transformed query to the database system for execution to generate a query result; and transmitting the query result to the executing application.

16. The one or more non-transitory computer readable media of claim 15, wherein transforming the query to obtain the transformed query comprises:

determining whether values in a conditional column associated with the conditional filtering satisfy a plurality of statistical criteria, the plurality of statistical criteria including at least a non-negativity criterion and a value distribution criterion; and responsive to determining that the values satisfy all of the plurality of statistical criteria, transforming the query.

17. The one or more non-transitory computer readable media of claim 15, further comprising:

analyzing the query to identify a first set of COUNT (DISTINCT) operations applied to a first dimensional column and a second set of COUNT(DISTINCT) operations applied to a second dimensional column;

determining optimization paths for each of the first set of COUNT(DISTINCT) operations and the second set of COUNT(DISTINCT) operations based on statistical properties of respective dimensional columns;

transforming the first set of COUNT(DISTINCT) operations when the statistical properties of the first dimensional column satisfy a first set of criteria;

transforming the second set of COUNT(DISTINCT) operations when the statistical properties of the second dimensional column satisfy a second set of criteria; and maintaining original COUNT(DISTINCT) operations for any set where respective statistical properties do not satisfy corresponding statistical criteria.

18. The one or more non-transitory computer readable media of claim 15, wherein the conditional filtering includes a plurality of comparison operations;

wherein the comparison operations include at least two types of operations selected from equality operations, range operations, pattern matching operations, and set membership operations; and wherein transforming the query comprises selecting different aggregation operations based on types of comparison operations present in the conditional filtering.

19. The one or more non-transitory computer readable media of claim 15, wherein the aggregation operations are selected based on operation types in the conditional filtering.

20. The one or more non-transitory computer readable media of claim 15, wherein the conditional filtering comprises multiple conditions combined using logical operators.

* * * * *